United States Patent
Anisimovskiy et al.

(10) Patent No.: US 10,832,432 B2
(45) Date of Patent: Nov. 10, 2020

(54) METHOD FOR TRAINING CONVOLUTIONAL NEURAL NETWORK TO RECONSTRUCT AN IMAGE AND SYSTEM FOR DEPTH MAP GENERATION FROM AN IMAGE

(71) Applicant: Samsung Electronics Co., Ltd., Gyeonggi-do (KR)

(72) Inventors: Valery Valerievich Anisimovskiy, Moscow (RU); Andrey Yurievich Shcherbinin, Moscow (RU); Sergey Alexandrovich Turko, Moscow (RU)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/556,874

(22) Filed: Aug. 30, 2019

(65) Prior Publication Data
US 2020/0074661 A1 Mar. 5, 2020

(30) Foreign Application Priority Data

Aug. 30, 2018 (RU) .............................. 2018131290

(51) Int. Cl.
*G06T 7/80* (2017.01)
*G06T 3/00* (2006.01)
(Continued)

(52) U.S. Cl.
CPC ............ *G06T 7/593* (2017.01); *G06T 3/0006* (2013.01); *G06T 3/4007* (2013.01); *G06T 7/80* (2017.01);
(Continued)

(58) Field of Classification Search
CPC .............................. G06T 7/593; H04N 13/271
See application file for complete search history.

(56) References Cited

U.S. PATENT DOCUMENTS 9,135,502 B2 * 9/2015 Haker ................ G06K 9/00369
9,275,078 B2 * 3/2016 Bhardwaj .......... G06K 9/00208
(Continued)

FOREIGN PATENT DOCUMENTS

| CN | 107274445 | 10/2017 |
| CN | 108389226 | 8/2018 |

(Continued)

OTHER PUBLICATIONS

Fu, Huan et al., "A Compromise Principle in Deep Monocular Depth Estimation", Aug. 28, 2017, pp. 9.
(Continued)

*Primary Examiner* — Irfan Habib
(74) *Attorney, Agent, or Firm* — The Farrell Law Firm, P.C.

(57) ABSTRACT

A method for training a convolutional neural network to reconstruct an image. The method includes forming a common loss function basing on the left and right images ($I_L$, $I_R$), reconstructed left and right images ($I'_L$, $I'_R$), disparity maps ($d_L$, $d_R$), reconstructed disparity maps ($d'_L$, $d'_R$) for the left and right images ($I_L$, $I_R$) and the auxiliary images ($I''_L$, $I''_R$) and training the neural network based on the formed loss function.

15 Claims, 9 Drawing Sheets

(51) Int. Cl.
*H04N 13/271* (2018.01)
*G06T 7/593* (2017.01)
*G06T 3/40* (2006.01)
*H04N 13/00* (2018.01)

(52) U.S. Cl.
CPC . *H04N 13/271* (2018.05); *G06T 2207/10012* (2013.01); *G06T 2207/20016* (2013.01); *G06T 2207/20081* (2013.01); *G06T 2207/20084* (2013.01); *H04N 2013/0081* (2013.01)

(56) References Cited

U.S. PATENT DOCUMENTS

| | | | | |
|---|---|---|---|---|
| 9,305,219 | B2* | 4/2016 | Ramalingam | G06K 9/00791 |
| 9,594,774 | B2 | 3/2017 | Bhardwaj et al. | |
| 9,750,399 | B2* | 9/2017 | Popovic | A61B 1/00009 |
| 10,664,953 | B1* | 5/2020 | Lanman | G06T 5/002 |
| 2010/0201682 | A1* | 8/2010 | Quan | G06T 15/04 |
| | | | | 345/419 |
| 2011/0052043 | A1* | 3/2011 | Hyung | G05D 1/0242 |
| | | | | 382/154 |
| 2013/0077850 | A1* | 3/2013 | Hirai | G06T 7/0004 |
| | | | | 382/149 |
| 2013/0101158 | A1* | 4/2013 | Lloyd | G06T 7/62 |
| | | | | 382/103 |
| 2013/0106837 | A1* | 5/2013 | Mukherjee | G06T 7/90 |
| | | | | 345/419 |
| 2014/0071240 | A1* | 3/2014 | Chen | G06T 7/70 |
| | | | | 348/46 |
| 2016/0000001 | A1* | 1/2016 | Bruce | A01C 5/064 |
| | | | | 172/604 |
| 2016/0012567 | A1 | 1/2016 | Siddiqui et al. | |
| 2016/0350906 | A1* | 12/2016 | Meier | G06T 7/579 |
| 2016/0350930 | A1* | 12/2016 | Lin | G06K 9/4628 |
| 2017/0193672 | A1 | 7/2017 | Bhardwaj et al. | |
| 2018/0059679 | A1* | 3/2018 | Taimouri | G06N 3/08 |
| 2018/0075602 | A1* | 3/2018 | Shen | G06T 7/50 |
| 2018/0096219 | A1* | 4/2018 | Socher | G06K 9/6292 |
| 2018/0182071 | A1* | 6/2018 | Ayari | G06N 3/08 |
| 2018/0286061 | A1* | 10/2018 | Shen | G06T 7/62 |
| 2019/0058870 | A1* | 2/2019 | Rowell | H04N 9/8227 |
| 2019/0139179 | A1* | 5/2019 | Wang | G06T 7/50 |
| 2019/0213481 | A1* | 7/2019 | Godard | G06N 3/0454 |
| 2019/0356849 | A1* | 11/2019 | Sapienza | G01S 3/00 |
| 2019/0387209 | A1* | 12/2019 | Yang | H04N 13/128 |
| 2020/0084427 | A1* | 3/2020 | Sun | H04N 13/128 |
| 2020/0090359 | A1* | 3/2020 | Pillai | G06T 7/75 |

FOREIGN PATENT DOCUMENTS

| | | |
|---|---|---|
| EP | 0 243 061 | 6/1993 |
| EP | 3 190 546 | 7/2017 |
| EP | 1 631 937 | 3/2018 |
| WO | WO 2018/046964 | 3/2018 |

OTHER PUBLICATIONS

Wang, Chaoyang et al., "Learning Depth from Monocular Videos using Direct Methods", Dec. 1, 2017, pp. 10.

Godard, Clement et al., "Unsupervised Monocular Depth Estimation with Left-Right Consistency", Apr. 12, 2017, pp. 14.

Yinda Zhang et al., ActiveStereoNet: End-to-End Self-Supervised Learning for Active Stereo Systems, Computer Science, Arxiv.org, Jul. 16, 2018, 27 pages.

Ji-Won Park et al., "Implementation of Improved Scale-invariant Loss Function for Predicting Disparity-Maps of Stereo Images Using Deep-Learning", Autumn Annual Conference of Institute of Electronics and Information Engineers, Nov. 2017, 4 pages.

International Search Report dated Dec. 10, 2019 issued in counterpart application No. PCT/KR2019/011197, 8 pages.

* cited by examiner

| depth estimation method | required number of images for training | data set for training | error metric | | | | | error metric | | | number of weights coefficients |
|---|---|---|---|---|---|---|---|---|---|---|---|
| | | | ARD | SRD | RMSE | RMSE (log) | RMSE (sc.inv.) | $\sigma<1.25$ | $\sigma<1.25^2$ | $\sigma<1.25^3$ | |
| claimed method (version 1) | 2 | KITTI + CityScapes | 0.118 | 0.809 | 4.692 | 0.196 | 0.192 | 0.865 | 0.954 | 0.979 | 25.8M |
| claimed method (version 2) | 2 | KITTI + CityScapes | 0.114 | 0.808 | 4.758 | 0.195 | 0.191 | 0.869 | 0.956 | 0.980 | 31.6M |
| H.Fu n ap., 2017 | 1 | KITTI | 0.105 | 0.540 | 3.903 | 0.154 | – | 0.886 | 0.975 | 0.994 | 186.2M |
| C. Wang n ap., 2017 | 3 | CityScapes→KITTI | 0.148 | 1.187 | 5.496 | 0.226 | – | 0.812 | 0.938 | 0.975 | 31.6M |
| C. Godard n ap., 2017 (VGG) | 2 | CityScapes→KITTI | 0.118 | 0.923 | 5.015 | 0.210 | 0.205 | 0.854 | 0.947 | 0.976 | 31.6M |
| C. Godard n ap., 2017 (VGG) | 2 | KITTI + CityScapes | 0.152 | 1.328 | 5.748 | 0.232 | 0.227 | 0.805 | 0.934 | 0.972 | 31.6M |
| C. Godard n ap., 2017 (ResNet) | 2 | CityScapes→KITTI | 0.114 | 0.898 | 4.935 | 0.206 | 0.204 | 0.861 | 0.949 | 0.976 | 58.5M |

FIG.7

METHOD FOR TRAINING CONVOLUTIONAL NEURAL NETWORK TO RECONSTRUCT AN IMAGE AND SYSTEM FOR DEPTH MAP GENERATION FROM AN IMAGE

CROSS-REFERENCE TO RELATED APPLICATION(S)

This application is based on and claims priority under 35 U.S.C. § 119(a) to Russian Patent Application Serial No. 2018131290, filed on Aug. 30, 2018, in the Russian Patent Office, the entire disclosure of which is incorporated herein by reference.

BACKGROUND

1. Field

The present disclosure relates generally to the field of image processing, and in particular, to a system and method for depth map estimation from a single image.

2. Description of Related Art

As a rule, a 2D image is a mapping of a certain 3D scene onto a plane, so an important task, among others, is to estimate a depth map for a 2D image. A depth map is an image in which the distance from the camera is stored for each pixel, rather that its color. A depth map can be produced using a special camera (for example, a laser scanner—LIDAR or an infrared scanner), and it can also be estimated from stereo pair images. However, depth map estimation from stereo pair images requires multiple views of the same scene at different positions (usually 2 (a stereo pair) or 4), for which a special stereo camera is needed, while the stereo camera shall have accurate calibration, which requires setting a distance between the camera centers, camera parameters and disparity from two/four images. Moreover, once the two/four images for each point are taken in a single image, a counterpart point is searched in another image, which can also be quite a challenging task, depending on the type of the scene. In addition, it is important to note that the algorithm for depth map estimation from stereo pair images relies on the exact specified relative position of cameras based on distance between the centers of these cameras. The slightest change in this rigid structure (such as displacement of cameras relative to each other, due to camera shake) leads to a significant deterioration in the results obtained.

The use of an infrared scanner is also quite expensive, and the depth map produced therewith is noisy. In addition, when it is used, additional restrictions are applied to the range while scanning the scene, in particular, the working distance of the infrared scanner is approximately from 5 to 10 meters. The use of a laser scanner is not only very expensive, but also impractical if, for example, the scene being scanned is moving. This is due to the fact that the laser scanner receives individual points during scanning, and it takes certain time to get each point. Therefore, if the scene has moved during scanning, the result from the laser scanner will be incorrect. In addition, the use of both an infrared scanner and a laser scanner requires installation of additional hardware in the form of these scanners.

There are also methods for depth map estimation based on machine learning on labeled data. However, these methods tend to work well only on the scenes resembling the ones contained in the labeled data. To be able to adapt to different scenery these methods require large labeled datasets, creation of which is also expensive and laborious.

Thus, there is a need for a precise depth map estimation method which is robust to variable training samples and camera setup and is capable of estimating a depth map from a single image.

SUMMARY

The present disclosure has been made to address at least the disadvantages described above and to provide at least the advantages described below.

In accordance with an aspect of the present disclosure, a method for training a convolutional neural network to reconstruct an image is provided. The method includes taking stereo pair images including a left and right images ($I_L$, $I_R$), inputting each of the left and right images ($I_L$, $I_R$) to a corresponding siamese convolutional neural network for depth map estimation, processing the input left and right images ($I_L$, $I_R$) to produce high-level feature maps and inverse depth maps for the left and right images, respectively, inputting the produced high-level feature maps to the convolutional neural network for camera parameters estimation, processing the produced high-level feature maps to produce parameters of a camera which shot the left and right images ($I_L$, $I_R$), applying an affine transform to the inverse depth maps for the left and right images ($I_L$, $I_R$), respectively, taking into account the produced camera parameters to produce disparity maps ($d_L$, $d_R$) for the left and right images ($I_L$, $I_R$), respectively, performing bilinear-interpolation sampling for the left image $I_L$ taking into account the produced disparity map $d_R$ for the right image $I_R$ to produce a reconstructed right image $I'_R$, performing bilinear-interpolation sampling for the right image $I_R$ taking into account the produced disparity map $d_L$ for the left image $I_L$ to produce a reconstructed left image $I'_L$, performing bilinear-interpolation sampling for the disparity map $d_L$ for the left image $I_L$ taking into account the produced disparity map $d_R$ for the right image $I_R$ to produce a reconstructed disparity map for the right image $I_R$, performing bilinear-interpolation sampling for the disparity map $d_R$ for the right image $I_R$ taking into account the produced disparity map $d_L$ for the left image $I_L$ to produce a reconstructed disparity map for the left image $I_L$, performing bilinear-interpolation sampling for the left image $I_L$ taking into account the reconstructed disparity map $d'_R$ for the right image $I_R$ to get an auxiliary right image $I''_R$, performing bilinear-interpolation sampling for the right image $I_R$ taking into account the reconstructed disparity map $d'_L$ for the left image $I_L$ to get an auxiliary left image $I''_L$, forming a common loss function basing on the left and right images ($I_L$, $I_R$), reconstructed left and right images ($I'_L$, $I'_R$), disparity maps ($d_L$, $d_R$), reconstructed disparity maps ($d'_L$, $d'_R$) for the left and right images ($I_L$, $I_R$) and the auxiliary images ($I''_L$, $I''_R$), and training the neural network based on the formed loss function.

In accordance with an aspect of the present disclosure, a method for training a convolutional neural network to reconstruct an image is provided. The method includes taking stereo pair images including the left and right images ($I_L$, $I_R$), inputting each of the left and right images ($I_L$, $I_R$) to a corresponding siamese convolutional neural network for depth map estimation, processing the input left and right images ($I_L$, $I_R$) to produce high-level feature maps, inverse depth maps and correction maps for the left and right images ($I_L$, $I_R$), respectively, inputting the produced high-level feature maps to the convolutional neural network for camera parameters estimation, processing the produced high-level feature maps to produce parameters of the camera which shot the left and right images ($I_L$, $I_R$), applying affine transform to inverse depth maps for the left and right images ($I_L$, $I_R$), respectively, taking into account the produced camera parameters to produce disparity maps ($d_L$, $d_R$) for the left and right images ($I_L$, $I_R$), respectively, using the right image correction map for the right image $I_R$ to produce a corrected right image, using the left image correction map for the left image $I_L$ to produce a corrected left image, performing bilinear-interpolation sampling for the corrected left image taking into account the produced disparity map $d_R$ for the right image $I_R$ to produce a reconstructed right image $I'_R$, performing bilinear-interpolation sampling for the corrected right image taking into account the produced disparity map $d_L$ for the left image $I_L$ to produce a reconstructed left image $I'_L$, performing bilinear-interpolation sampling for the disparity map $d_L$ for the left image $I_L$ taking into account the produced disparity map $d_R$ for the right image $I_R$ to produce a reconstructed disparity map for the right image $I_R$, performing bilinear-interpolation sampling for the disparity map $d_R$ for the right image $I_R$ taking into account the produced disparity map $d_L$ for the left image $I_L$ to produce a reconstructed disparity map for the left image $I_L$, performing bilinear-interpolation sampling for the corrected left image taking into account the reconstructed disparity map $d'_R$ for the right image $I_R$ to get an auxiliary right image $I''_R$, performing bilinear-interpolation sampling for the corrected right image taking into account the reconstructed disparity map $d'_L$ for the left image $I_L$ to get an auxiliary left image $I''_L$, forming a common loss function basing on the corrected left and right images, reconstructed left and right images ($I'_L$, $I'_R$), correction maps, disparity maps ($d_L$, $d_R$), reconstructed disparity maps ($d'_L$ $d'_R$) for the left and right images ($I_L$, $I_R$) and the auxiliary images ($I''_L$, $I''_R$), and training the convolutional neural network based on the formed loss function.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 7 is a diagram of depth map estimation results, according to an embodiment.

DETAILED DESCRIPTION

Figure 1:
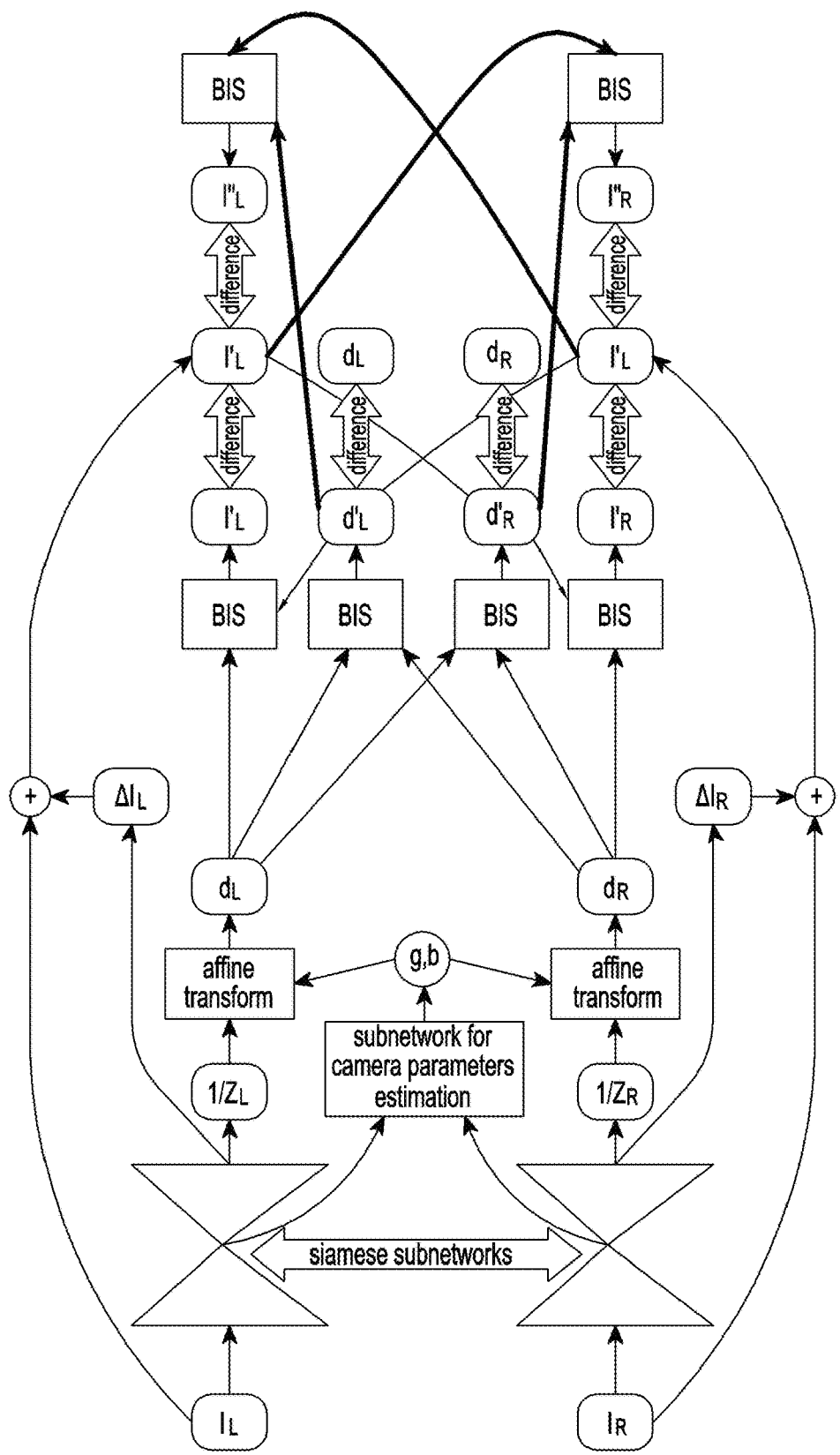
FIG. 1 is a flowchart for training a convolutional neural network to estimate a depth map of an analyzed image, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

Disclosed herein is the use of a neural network to reconstruct a pair image from an analyzed image in such a way that the reconstructed image and the analyzed one form together a stereo pair. Reconstruction is performed using disparity maps derived from inverse depth maps, generated by siamese neural subnetworks applied to one and the other stereo image. A loss function is then formed, which is used to train the siamese convolutional neural subnetwork to estimate the depth map from a single image.

FIG. 1 is a flowchart for training a convolutional neural network to estimate a depth map of an analyzed image, according to an embodiment.

First, in order to train a neural network, a stereo pair is taken (i.e. a left image $I_L$ and a right image $I_R$ of the stereo pair). These images are processed separately by siamese convolutional neural subnetworks for depth map estimation, and the siamese convolutional neural subnetworks have the same weights for uniform processing of both stereo pair images. In particular, a corresponding image is inputted to each of the siamese convolutional neural subnetworks. Inverse depth maps $1/z_L$ and $1/z_R$ for the left and right images, respectively, are outputted from these siamese subnetworks. In particular, at output of each of the siamese convolutional neural subnetworks, an image pyramid is formed for the inverse depth maps for the left and right images, respectively. In addition, while the input left and right images are being processed by the siamese convolutional neural subnetworks, the corresponding high-level feature maps are produced. In particular, image processing of any of the siamese convolutional neural subnetworks includes a step of compressing data encoding and then a step of data decoding, where the high-level feature maps are generated upon completion of the step of compressing encoding before beginning of a data decoding step. Optionally, correction maps $\Delta I_L$ and $\Delta I_R$ of the left and right image, respectively, are additionally generated at the output of these siamese subnetworks. Thus, similarly to the above, an image pyramid for the correction maps for the left and right images, respectively, is also formed at the output of each of the siamese convolutional neural subnetworks.

The generated high-level feature maps for the left and right images are inputted to another convolutional neural subnetwork—a convolutional neural subnetwork for the camera parameters estimation. After the produced high-level feature maps have been processed by this network, the parameters of the stereo camera, with which the original left and right stereo pair images were taken, are produced at the network output, which will be further described in more detail with reference to FIG. 3 and FIG. 4. In particular, these stereo camera parameters are gain (g) and bias (b). Then, the produced stereo pair parameters g and b are used for affine transform of inverse depth maps $1/z_L$ and $1/z_R$ to produce disparity maps $d_L$ and $d_R$, i.e. affine transform is used to form an image pyramid for disparity maps for the left and right images, respectively. The disparity maps $d_L$ and $d_R$ for the left and right images are used to reconstruct the corresponding images using the original images for the counterpart images. In particular, the disparity map $d_R$ for the right image and the original left image are used to reconstruct the right image, and the disparity map $d_L$ for the left image and the original right image are used to reconstruct the left image. If left and right image correction maps $\Delta I_L$ and $\Delta I_R$ were additionally generated at the output of the siamese subnetworks, then the corresponding disparity maps and the original images for the opposite images, corrected using the generated correction maps, are used to reconstruct the left and right images. In this case, the right image disparity map $d_R$ and the corrected left image are used to reconstruct the right image, and the left image disparity map $d_L$ and the corrected right image are used to reconstruct the left image. In particular, the image pyramid for disparity maps is used to produce a pyramid of reconstructed images for the left and right images, respectively.

Thus, bilinear-interpolation sampling (BIS) is performed for the left image disparity map $d_L$ and the original right image/corrected right image to produce the reconstructed left image $I'_L$, and bilinear-interpolation sampling is performed for the right image disparity map $d_R$ and the original left image/corrected left image to produce the reconstructed right image $I'_R$. In particular, bilinear-interpolation sampling to produce the reconstructed left image $I'_L$, means bilinear-interpolation sampling of points from the original or corrected right image using the left image disparity map $d_L$. Thus, to get a point of the reconstructed left image with coordinates (x,y), a point from the original or corrected right image with coordinates $(x+d_L(x,y),y)$ is needed. Due to the fact that the first coordinate $x+d_L(x,y)$ is not an integer, the pixel value at this point is interpolated by 4 adjacent points with integer coordinates (i.e., by points on the original or corrected right image with coordinates $(\lfloor x+d_L(x,y)\rfloor,y)$, $(\lfloor x+d_L(x,y)\rfloor+1,y)$, $(\lfloor x+d_L(x,y)\rfloor,y+1)$, $(\lfloor x+d_L(x,y)\rfloor+1,y+1)$), the value is interpolated by the bilinear interpolation technique.

In addition, given that the transform operator applied to the left image to produce the right one shall match the conversion operator applied to the left image depth map to produce the right image depth map, the bilinear-interpolation sampling is additionally performed for the disparity maps $d_L$ and $d_R$ themselves to produce the reconstructed disparity maps $d'_R$ and $d'_L$, respectively, (i.e., to produce a reconstructed disparity map $d'_L$) bilinear-interpolation sampling is performed for the disparity map $d_R$ with the disparity map $d_L$, and vice versa (e.g., image pyramids for the reconstructed disparity maps). Therefore, to get a point of the reconstructed disparity map $d'_L$ with coordinates (x,y), a point from the disparity map $d_R$ with coordinates $(x+d_L(x,y),y)$ is needed, etc. Bilinear-interpolation sampling is performed again for the reconstructed right and left disparity maps $d'_R$ and $d'_L$, together with the original or corrected images for the opposite images to produce auxiliary images $I''_R$ and $I''_L$ (e.g., image pyramids for auxiliary images), which are calculated to enhance the training signal by applying a larger amount of data. Summarizing the above, it is noted that consideration of the image pyramid at any step implies further application of these operations for each level of the pyramid and, consequently, also producing the image pyramid as a result of these operations.

The original or corrected left and right images $I_L$ and $I_R$, reconstructed left and right images $I'_L$ and $I'_R$, disparity maps $d_L$ and $d_R$, reconstructed disparity maps $d'_L$ and $d'_R$ for left and right images and the auxiliary images $I''_L$ and $I''_R$ are further used to form a loss function, which is used as a training signal for the entire convolutional neural network to reconstruct the analyzed image (i.e., the formed loss function is used to train the entire network (selection of network weights)) in accordance with the back propagation method. In particular, to form a loss function, the reconstructed images $I'_L$ and $I'_R$ and the auxiliary images $I''_L$ and $I''_R$ are compared with the original or corrected images $I_L$ and $I_R$, and the reconstructed disparity maps $d'_L$ and $d'_R$ are compared with the originally produced disparity maps $d_L$ and $d_R$. As a result, the trained siamese subnetwork is capable of depth map estimation from a single image. It is preferred to use the corrected images with the help of the generated left and right image correction maps to produce the reconstructed images $I'_L$ and $I'_R$ and auxiliary images $I''_L$ and $I''_R$, since it greatly improves precision when estimating a depth map using a trained siamese subnetwork.

Figure 2:
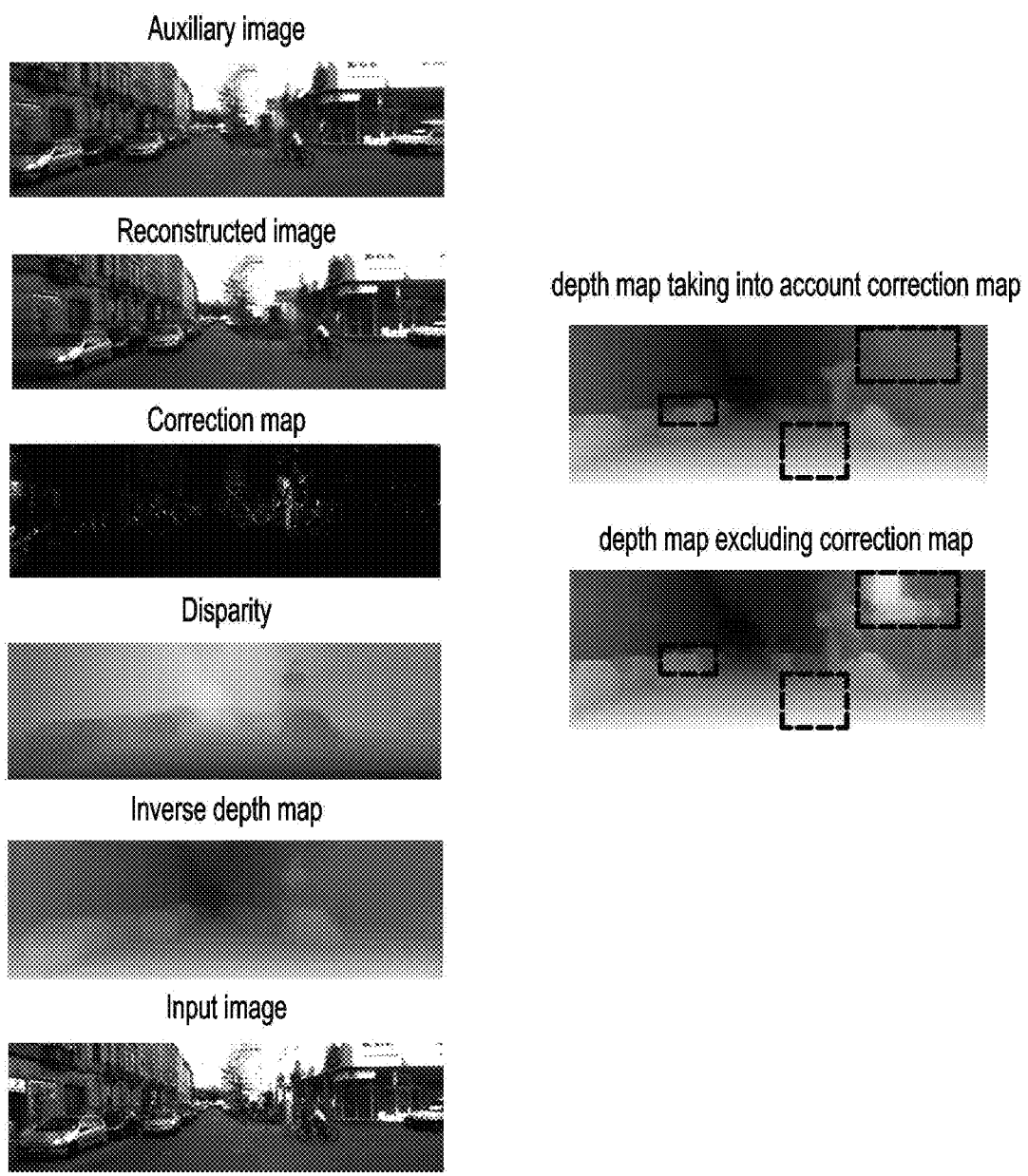
FIG. 2 is a diagram of maps and images produced in implementing the method for training a convolutional neural network to estimate a depth map of the analyzed image, according to an embodiment.

FIG. 2 is a diagram of maps and images produced in implementing the method for training a convolutional neural network to estimate a depth map of the analyzed image, according to an embodiment.

In particular, the original input image was an arbitrary image of a street, on which a lot of cars are parked and cyclists pass, and there are buildings nearby. Above the original input image is an inverse depth map, produced with respect to the original input image in accordance with the described method. The following image, located above the inverse depth map, is the corresponding disparity map. Both the inverse depth map and the disparity map depict obviously the main objects captured in the original input image. Next is a correction map produced for the original input image, and the correction map includes rather sparse corrections, which tend to concentrate at relief boundaries/at occlusions at the boundaries of those objects that block the view of other more distant objects. Above the correction map there is a reconstructed image, which is reconstructed in accordance with the described method, and above the reconstructed image there is a corresponding auxiliary image. As illustrated in FIG. 2, the reconstructed image and the auxiliary image are close enough to the original input image. To the right and below of the correction map there is a depth map estimated without the use of a correction map (i.e., comparison was made with the original image but not with the corrected one). In the depicted depth map, excluding correction maps, rectangular areas are highlighted, in which the depth map excluding correction maps obviously contains errors that are concentrated at the relief boundaries/ occlusions at the boundaries of the objects that block the view of other more distant objects. To the right and above of the correction map there is a depth map estimated using a correction map. In the depicted depth map, taking into account correction maps, rectangular areas are highlighted that correspond to rectangular areas in which the depth map, excluding correction maps, contains obvious errors. As clearly follows from the images of these two depth maps, when implementing the method, taking into account correction maps (i.e., when compared with the corrected image), the errors are smoothed and the precision of the depth map estimation is significantly improved.

The loss function, based only on comparison of the reconstructed image and the original image, used in the known solutions for unsupervised depth map estimation, generates an error at some step of the network, due to which the network begins to be trained incorrectly, maximally smoothing the geometry of objects in the image, which leads to significant deterioration in precision of depth map estimation.

To prevent this drawback, in addition to producing inverse depth maps, a convolutional neural subnetwork for depth map estimation generates left and right correction maps $\Delta I_L$ and $\Delta I_R$, and the correction maps $\Delta I_L$ and $\Delta I_R$ are generated only for two lower levels of the image pyramid. The generated correction maps $\Delta I_L$ and $\Delta I_R$ are added to the corresponding original input images to produce corrected images, which are then used to calculate the photometric difference between the reconstructed image and the corrected image (e.g., an image difference module averaged over channels and the image height and width is calculated). To limit the correction maps and, thereby, regularize training for priority study of the image objects' geometry, but not just the difference between the images (e.g., between colors of pixels), an additional function $L_{corr}$ of losses is introduced for correction. In the process of training of a convolutional neural network to reconstruct the analyzed image, the difference between the reconstructed image and the corrected image is minimized due to both image correction and image objects' geometry recognition. The introduced additional function $L_{corr}$ allows further applying almost zero correction when analyzing the image area in which the difference between the reconstructed and original image is explained by the scene's geometry, and allows further applying full correction when analyzing the image area in which difference between these images is not explained by the geometry. The loss $L_{corr}$ function for correction is calculated as Equation (1):

$$L_{corr} = w_{corr} \sum_{i=1}^{2} \frac{1}{N^{(i)}} \sum |\Delta I_L^{(i)}| + |\Delta I_R^{(i)}| \quad (1)$$

where $w_{corr}$ is a positive parameter that was selected iteratively and experimentally when training a convolutional neural network to reconstruct the analyzed image using an arbitrarily selected stereo pair images from the KITTI database in combination with the Cityscapes database, and $N^{(i)}$ is the number of correction map points for left or right images at the i-th level of the image pyramid of correction maps for left or right images. The number of correction map points for left and right images at the same level of the image pyramid is the same, so it does not matter what number of points of which particular correction map is taken. The higher the quality of analyzed images, the greater the parameter $w_{corr}$ is and the greater the correction loss function is (the requirement to minimize the correction). The parameter equal to $w_{corr}$ is essential, since it is responsible for controlling the "edge" between the network's ability to explain images geometrically and the network's ability to explain images by correction, and the results of depth estimation do not too much depend on this parameter, so it can be selected in sufficiently wide range of values (the value can be approximately 1.5 times more or less) without requiring high precision of estimation of this parameter. This additional correction loss function $L_{corr}$ complements the common loss function based on the differences described above when comparing images.

To determine the common loss function, based on the above differences obtained in comparing images, in addition to reconstructed images $I'_L$ and $I'_R$ and disparity maps $d_L$ and $d_R$, the use is also made of reconstructed disparity maps $d'_L$ and $d'_R$ and auxiliary images $I''_L$ and $I''_R$, produced with the help of these reconstructed disparity maps $d'_L$ and $d'_R$, where the common loss function for reconstructed images is calculated as Equation (2):

$$L_{rec}^{(L/R)} = \sum_{i=1}^{4} \frac{1}{N^{(i)}} \sum |I_{L/R}^{(i)} - I_{L/R}'^{(i)}| + w_{aux}|I_{L/R}^{(i)} - I_{L/R}''^{(i)}| \quad (2)$$

$$L_{rec} = L_{rec}^{(L)} + L_{rec}^{(R)}$$

where index L is responsible for common loss function for the reconstructed left image, and index R—for the right image.

The second addend of the common loss function for reconstructed images is responsible for comparing the original input image or corrected image with the produced auxiliary image, so this addend complements the loss function for reconstructed images in order to achieve greater depth estimation precision, as the process is trained to estimate the depth that would satisfy not only the reconstructed images, but also the auxiliary images, thereby eliminating some of the erroneous directions in searching for depth. The parameter $w_{aux}$ is a positive parameter that was also selected empirically when training the network on a randomly selected stereo pair images from the KITTI database in combination with the Cityscapes database, and $N^{(i)}$ is the number of points of the original image or the reconstructed image for the left or right images at the i-th level of the image pyramid of original images or reconstructed images for the left or right images. Similarly, the number of points of the original and reconstructed image for the left and right images on the same level of the image pyramid is the same, so it does not matter what number of points of which particular image is taken. The common loss function for reconstructed images is equal to the sum of the loss function for the reconstructed left image and the loss function for the reconstructed right image.

As an additional embodiment, it is important to note that the described method for training a convolutional neural network to reconstruct an image is also feasible without producing auxiliary images $I''_R$ and $I''_L$ and comparing them with the original input or corrected image, respectively. In this case, the second addend of the loss function for the reconstructed image will be absent, which will naturally affect the precision of the resulting depth map.

In addition, the described method for teaching a convolutional neural network to reconstruct an image also works without producing image correction maps $\Delta I_L$ and $\Delta I_R$, as it was mentioned above. In this case, the reconstructed and auxiliary images are compared with the original input images.

As an additional embodiment, a method for training a convolutional neural network to reconstruct an image can be implemented by replacing a convolutional neural network of camera parameters estimation with obtaining camera parameters directly from an external source (e.g., by installing an additional sensor or simply by accessing an external database containing the values of such parameters in relation to the camera used). Alternatively, a convolutional neural network for camera parameters estimation can be replaced directly with a distance meter between cameras or a focal length meter.

In addition, a method for teaching a convolutional neural network to reconstruct an image is also feasible without using siamese subnetworks. Namely, this method can also be trained on a stereo pair images, but the depth can be estimated only for one of the stereo pair images, the second one will be used only to produce reconstructed and auxiliary images and, accordingly, to calculate the loss function for training, which will also affect the precision of the final depth map. In addition, this method for teaching a convolutional neural network to reconstruct an image is less robust to data samples diversity.

The method for depth map estimation can also be carried out using the original input images instead of high-level feature maps to input them to the convolutional neural network for camera parameters estimation. After the produced original input images have been processed by this network, the stereo camera parameters—focal length (F) and stereo baseline (B) are at the output of the network, which will be discussed in more detail later.

Figure 3:
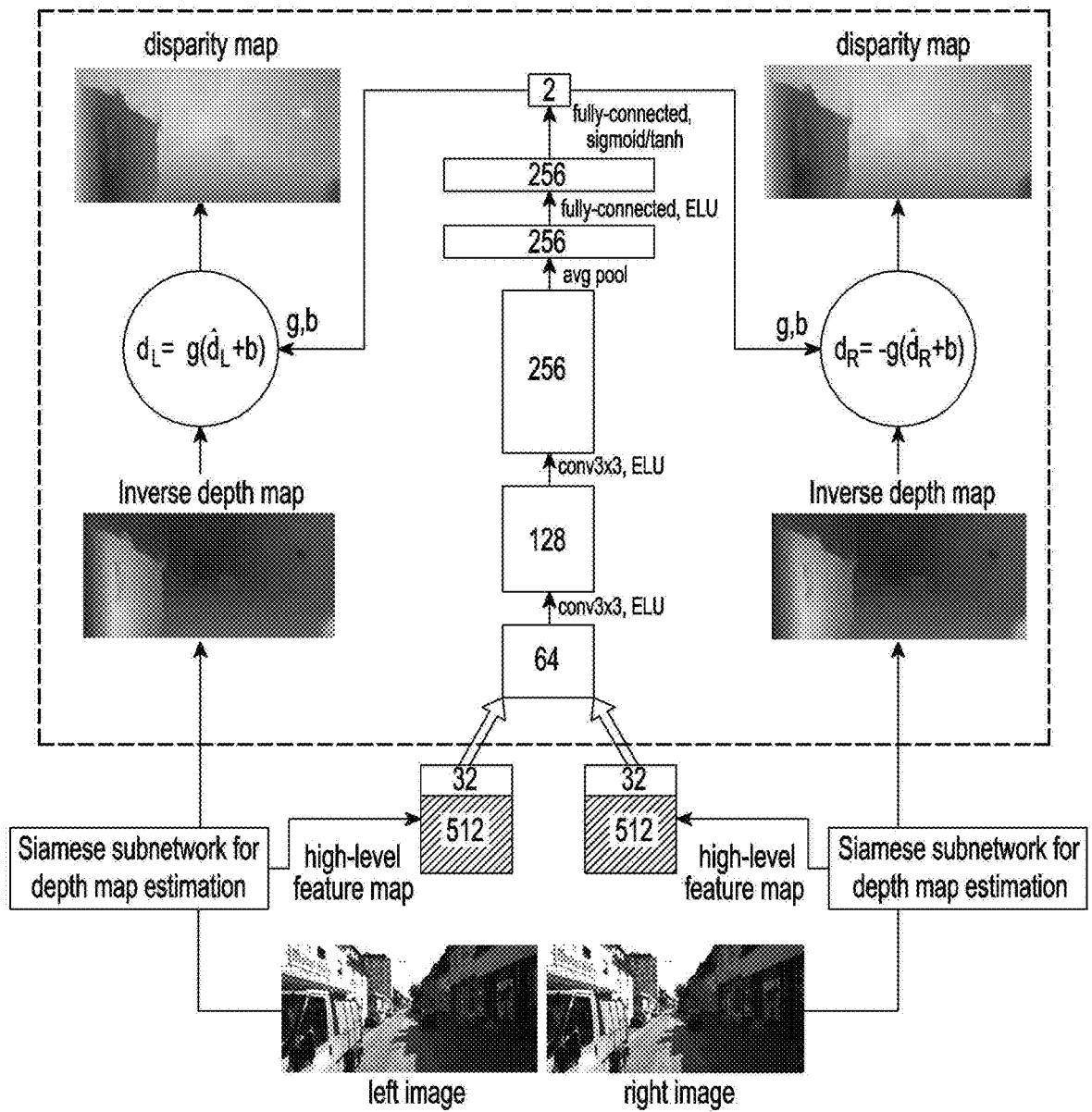
FIG. 3 is a flowchart for estimating camera parameters and using these parameters for producing disparity maps, according to an embodiment.

FIG. 3 is a flowchart for estimating camera parameters and using these parameters for producing disparity maps, according to an embodiment.

Namely, FIG. 3 shows two images—left and right, which are inputted to siamese subnetworks for depth map estimation. As described above with respect to FIG. 1, inverse depth maps for left and right images, respectively, are at the output of these siamese subnetworks. In addition, during processing of the input left and right images by the siamese convolutional neural subnetworks, the corresponding high-level feature maps for the left and right images, respectively, are produced as described above. The combination of these high-level feature maps for the left and right images is inputted to a separate convolutional neural network for estimation of camera parameters—gain and bias.

High-level feature maps do not describe the parameters of the objects indicated on the images, but recognize and determine the objects themselves through their properties. Thus, a high-level feature map is a three-dimensional array W×H×d, with W being a width of a high-level feature map, H being its height, and d being the depth equal to 512. Next, a layer having the same height and width, but with the depth of 32, is selected from the array. This layer is used by the subnetwork to estimate camera parameters, to enable it to recognize the most distinguishable large objects that will allow obtain most accurate possible information on camera parameters by comparison of the left and right images. The ratio of 32 to 512 is selected empirically.

Further, the selected layers from the high-level feature maps for the left and right images are concatenated (i.e., are applied to each other along the d axis and are inputted to a convolutional neural subnetwork for camera parameters estimation). Concatenation of these two layers makes an array with a depth of 64 (64 feature maps). After having been processed within the subnetwork (convolution (cony) 3×3, ELU (exponential linear unit) activation function)), an array with a depth of 128 is produced, then after similar processing (cony 3×3, ELU activation function), an array with a depth of 256 is produced. Further, an averaging operation (avg pool) is applied along W and H axes inside the subnetwork, where the depth of the resulting array is still 256. Further, a fully-connected operation is applied ("full-connected layer" (i.e., an input vector is multiplied by the matrix of the trained weights, resulting in an output vector)) with an ELU activation function, where the resulting array depth is still 256. Further, a fully-connected operation is applied again, as a result of which the resulting array has a depth of 2, where the used activation function changes to the sigmoid or tanh activation function (i.e., 2 parameters are obtained) which represent gain (g) and bias (b).

Then, based on these coefficients, disparities are calculated according to Equation (3) below, and the corresponding disparity maps are generated (the above-mentioned affine transform is used):

$$\begin{cases} d_L = g(\hat{d}_L + b) \\ d_R = -g(\hat{d}_R + b) \end{cases} \quad (3)$$

where $\hat{d}_L$, and $\hat{d}_R$ and are inverse depths for left and right images, respectively, determined according to the corresponding inverse depth maps.

The depth for the left and right images is determined as Equation (4):

$$\begin{cases} z_L = \dfrac{1}{\text{percentile}(\hat{d}_L, 99.99\%) - \hat{d}_L} \\ z_R = \dfrac{1}{\hat{d}_R - \text{percentile}(\hat{d}_R, 0.01\%)} \end{cases} \quad (4)$$

The technical result to be achieved lies in robust to training samples diversity (i.e., to different focal lengths and stereo baselines).

Figure 4:
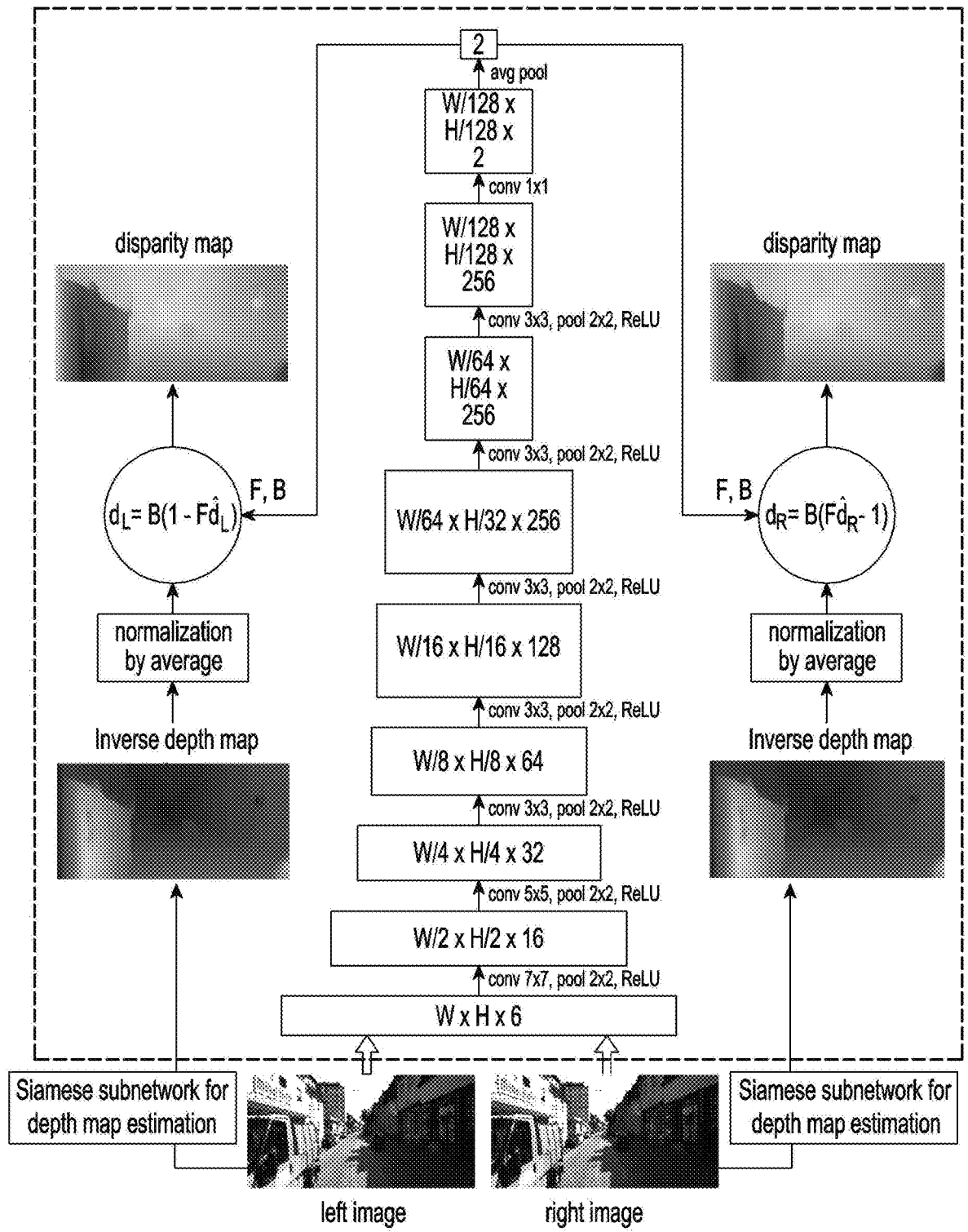
FIG. 4 is a flowchart for estimating camera parameters and using these parameters for producing disparity maps, according to an embodiment.

FIG. 4 is a flowchart for estimating camera parameters and using these parameters for producing disparity maps, according to an embodiment.

First, left and right images are concatenated (producing an array W×H×6 in size due to concatenation of two RGB images, each having three color channels), thereafter a 7-7 convolution operation, subsampling operation (pool) 2×2 with ReLU (rectified linear unit) activation function are applied to the former within this subnetwork. The result is an array, the width and height of which is reduced by half, and the number of feature maps becomes 16 (W/2×H/2×16). The result is an array, the width and height of which is reduced by half, and the number of feature maps becomes (W/2×H/2×16). Next, convolution operation 5×5, subsampling operation 2×2 with ReLU activation function are applied. The result is an array the width and height of which is halved, and the number of feature maps becomes 32 (W/4×H/4×32). Next, convolution operation 3×3, subsampling operation 2×2 with ReLU activation function are applied. The result is an array, the width and height of which is halved again, and the number of feature maps becomes (W/8×H/8×64). Next, convolution operation 3×3, subsampling operation 2×2 with ReLU activation function are applied again, thus an array is produced, the width and height of which is halved again, and the number of feature maps becomes 128 (W/16×H/16× 128). Then, convolution operation 3×3, subsampling operation 2×2 with ReLU activation function are applied again, thus an array is produced, the width and height of which is halved again, and the number of feature maps becomes 256–W/32×H/32×256. Then, convolution operation 3×3, subsampling operation 2×2 with ReLU activation function are applied again, this results in an array, the width and height of which is halved again, but the number of feature maps remains unchanged (W/64×H/64×256). Then convolution operation 3×3, subsampling operation 2×2 with ReLU activation function are applied again. The result is an array, the width and height of which is halved again, and the number of feature maps remains unchanged again (W/128×H/128×256). Next, convolution operation 1×1 is applied, as a result of which the array is produced with the following parameters: W/128×H/128×2. The averaging operation is applied along the W and H axes, as a result of which 2 final parameters are obtained. This subnetwork is deeper and not just gain and bias are at its output, but also the camera parameters themselves—focal length (F) and stereo baseline (B)

Then, the inverse depth maps normalized by the mean are converted into disparity maps, where disparity for the left and right images is calculated as Equation (5).

$$\begin{cases} d_L = B(1 - F\hat{d}_L), & \text{where } \hat{d}_L = \frac{1}{z_L} \\ d_R = B(F\hat{d}_R - 1), & \text{where } \hat{d}_R = \frac{1}{z_R} \end{cases} \quad (5)$$

Figure 5:
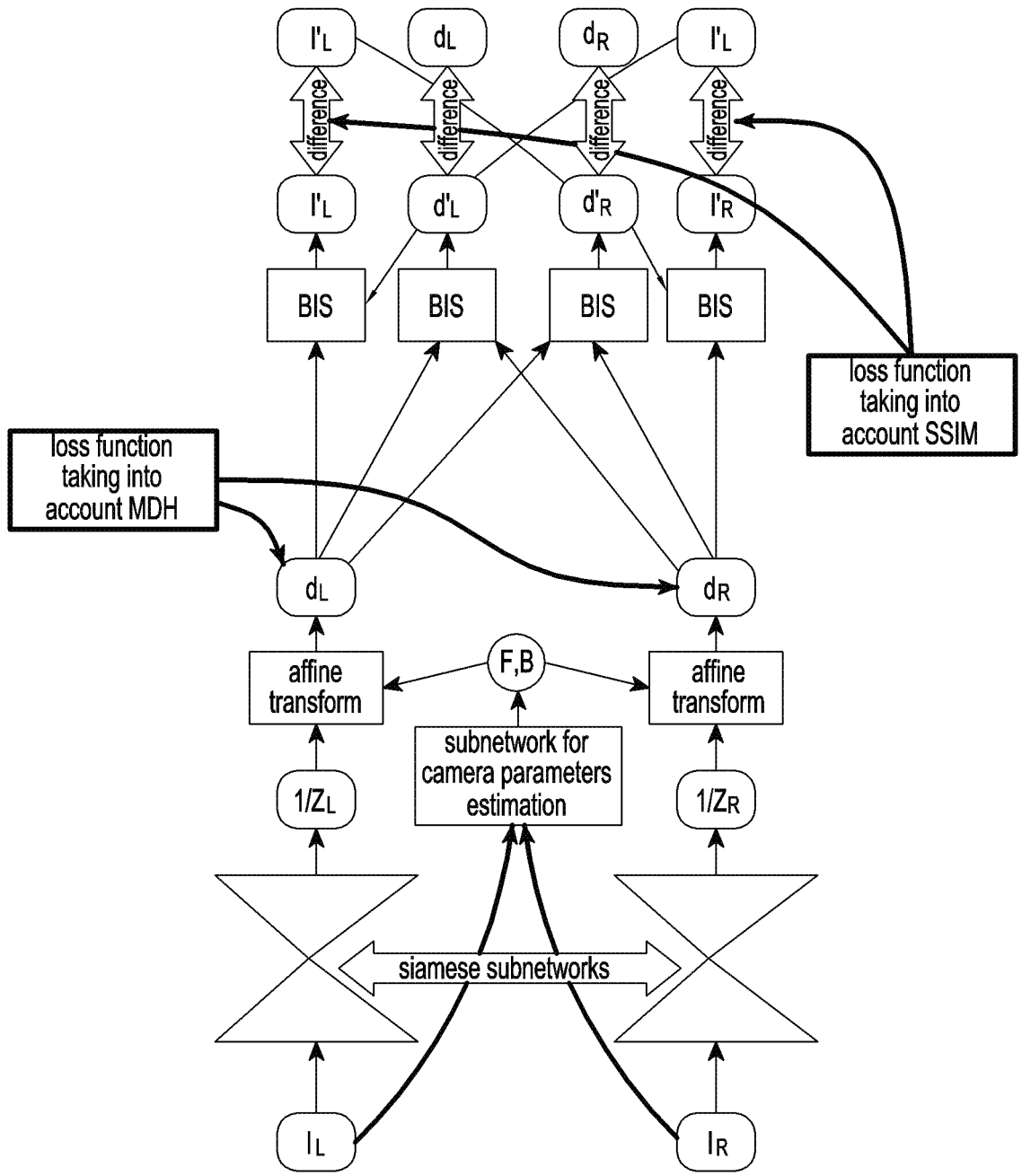
FIG. 5 is a flowchart for training a convolutional neural network to estimate a depth map of an analyzed image, according to an embodiment.

FIG. 5 is a flowchart for training a convolutional neural network to estimate a depth map of an analyzed image, according to an embodiment.

Non-high-level feature maps are inputted to the convolutional neural subnetwork for camera parameters estimation, but the original input left and right images.

However, in addition, when comparing the reconstructed images with the original input images, the structural similarity index (SSIM) is taken into account—a measure taking into account textures, gradients, etc. (i.e., pixels may be not the same, but the environment should be similar).

The loss function for reconstructed images, taking into account SSIM, is calculated as Equation (6).

$$L_{rec}^{(L)} = \sum_{i=1}^{4} \frac{1}{N^{(i)}} \sum \left( 0.85 * \frac{1 - SSIM\left(I_L^{(i)}, I_L^{\prime(i)}\right)}{2} + 0.15 * \left| I_L^{(i)}, I_L^{\prime(i)} \right| \right) \quad (6)$$

$$L_{rec} = L_{rec}^{(L)} + L_{rec}^{(R)}$$

N (i) is the number of points of the original image or the reconstructed image for the left or right images at the i-th level of the image pyramid of disparity maps or reconstructed disparity maps for left or right images. Similarly, at the same level of the image pyramid, the number of points of these images is the same, so it does not matter the number of points of which particular image is taken.

In addition, when generating disparity maps, an additional loss function is calculated by taking into account the maximum distance heuristic (MDH) as in Equation (7).

$$L_{MDH} = 0.1 \sum_{i=1}^{4} \frac{1}{N^{(i)}} \sum |d_L^{(i)}| + |d_R^{(i)}| \quad (7)$$

The parameter equal to 0.1 was obtained empirically, however, its slight change (e.g., 1.5 times) does not have a special effect on the result. $N^{(i)}$ is the number of points of the disparity map for the left or right images at the i-th level of the image pyramid of disparity maps for the left or right images. Similarly, at the same level of the image pyramid, the number of points of these images is the same, so it does not matter the number of points of which particular image is taken.

This loss function is used when there are similar pixels in the image (e.g., when analyzing homogeneous areas), teaching a convolutional neural network to select a pixel basing on the smallest disparity (i.e., based on the greatest distance). In homogeneous areas, as well as periodic regions, it is difficult to compare the points on the left/right image, since all points of a homogeneous region are matched in color for any point of the same region in another picture. The heuristics mentioned is introduced to eliminate this ambiguity, since in this situation, it instructs the network to select points with minimal disparity (i.e., maximum distance from the point of shooting).

Similar to the previous embodiment, inverse depth maps are normalized by the average before applying an affine transform to them to produce disparity maps.

Figure 6A:
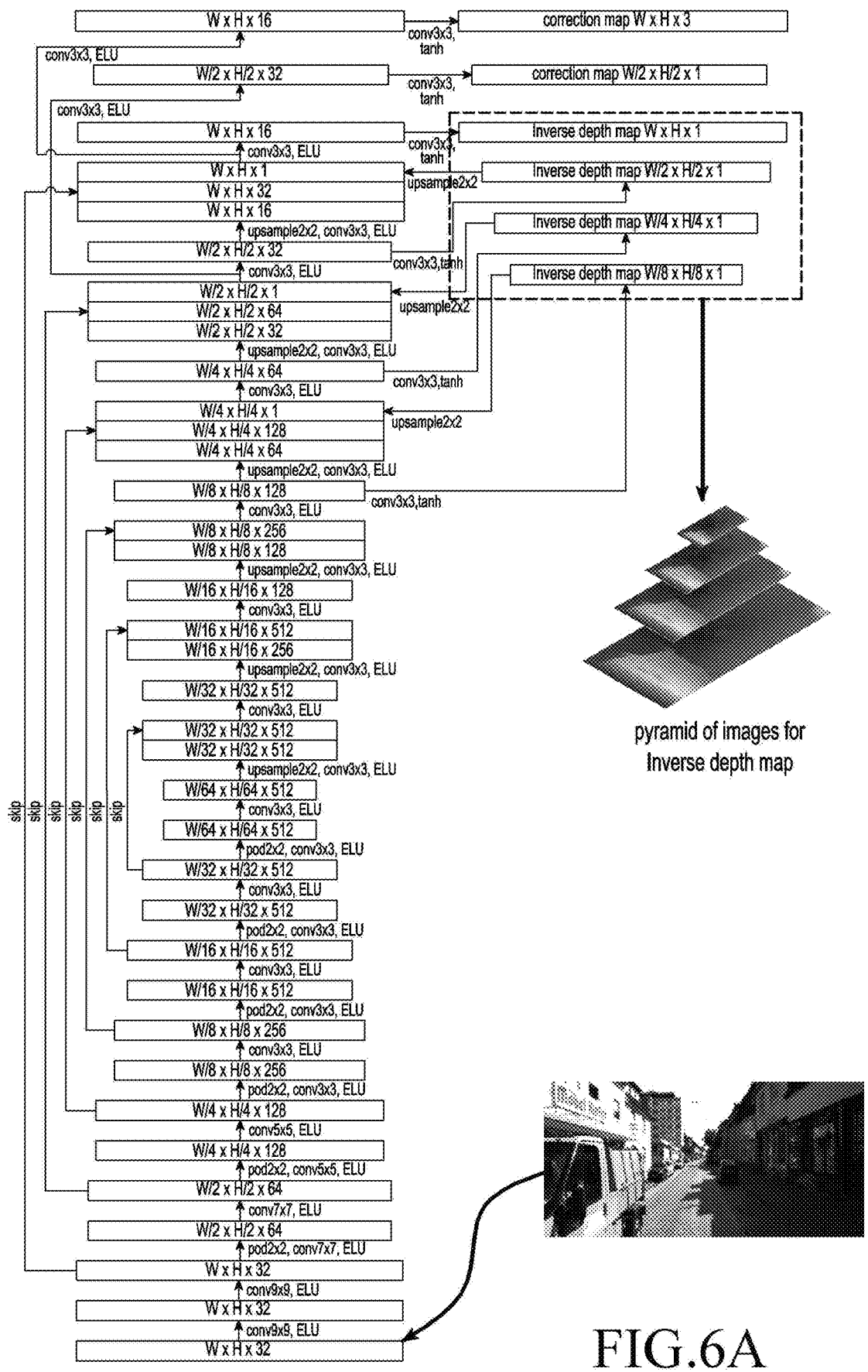
FIG. 6A is a processing diagram using a siamese convolutional neural subnetwork for depth map estimation, according to an embodiment.

FIG. 6A is a diagram of processing using a siamese convolutional neural subnetwork for depth map estimation, according to an embodiment.

This subnetwork has U-Net architecture (part of compression encoding, followed by a decoding part, as mentioned above with reference to FIG. 1). As mentioned above, at the output of this subnetwork, a 4-level image pyramid for inverse depth maps is produced, which is then used to form a 4-level image pyramid for disparity maps, while in parallel with generation of inverse depth maps, only a 2-level image pyramid is generated for correction maps to reduce computational complexity, since it was found empirically that using more levels for an image pyramid for correction maps does not affect the result. The use of image pyramids is caused by the fact that, as a rule, an image, that has a resolution of more than 4 times less than the resolution of the original input image, is already quite smooth, and aberrations present thereon are insignificant. Therefore, the described network is trained to ignore information that is not related to depth (i.e., it is less dependent on quality and noise of images of a training sample).

As illustrated in FIG. 6A, when processing a subnetwork in part of compressing coding, the height and width of the image decrease (as a result, 64 times), and the number of feature maps grows up to 512 feature maps. Then in the decoding part, the image size increases again. A subsample operation is "max-pooling", according to which a maximum value is selected from a square 2×2. In addition, as illustrated in FIG. 6A, in the siamese convolutional neural subnetwork for depth map estimation, the so-called skip links (transfer links) are used, which link the layers of the subnetwork that are not adjacent to each other, to preserve the details of the original input image by transferring the corresponding array from the compression encoding part into the decoding part and its concatenation with an array having the appropriate height and width. As shown in FIG. 1, the first skip-link operation (marked as "skip" in FIG. 1) transfers the output of the second layer (i.e., an array of size W×H×32) into the decoding part and concatenates with the output of the next layer having the dimensions W×H×16, etc. The resolution increase operation applied to the decoding part is marked on the drawing as "upsample". Image pyramids for inverse depth maps are formed as a result using convolution operations (cony 3×3) and activation functions (tanh). In particular, the top level of the image pyramid for inverse depth maps (i.e., an array of size W/8×H/8×1) is produced from an array of the decoding part of size W/8×H/8×128 by applying the convolution operation 3×3 and activation function tanh.

To regularize generation of an inverse depth map during generation of the disparity map, a loss function of consistency of the left and right images is calculated as in Equation (8).

$$L_{con} = 0.6 \sum_{i=1}^{4} \frac{1}{N^{(i)}} \sum |d_L^{(i)} - d_L'^{(i)}| + |d_R^{(i)} - d_R'^{(i)}| \quad (8)$$

This loss function "resembles" subnetworks in analyzing one scene at two different angles. The parameter, equal to 0.6, is obtained empirically, but its slight change (e.g., 1.5 times) does not have a special effect on the result. $N^{(i)}$ is the number of points of the disparity map or the reconstructed disparity map for the left or right images at the i-th level of the image pyramid of disparity maps or reconstructed disparity maps for the left or right images. Similarly, at the same level of the image pyramid, the number of points of these images is the same, so it does not matter the number of points of which particular image is taken.

Figure 6B:
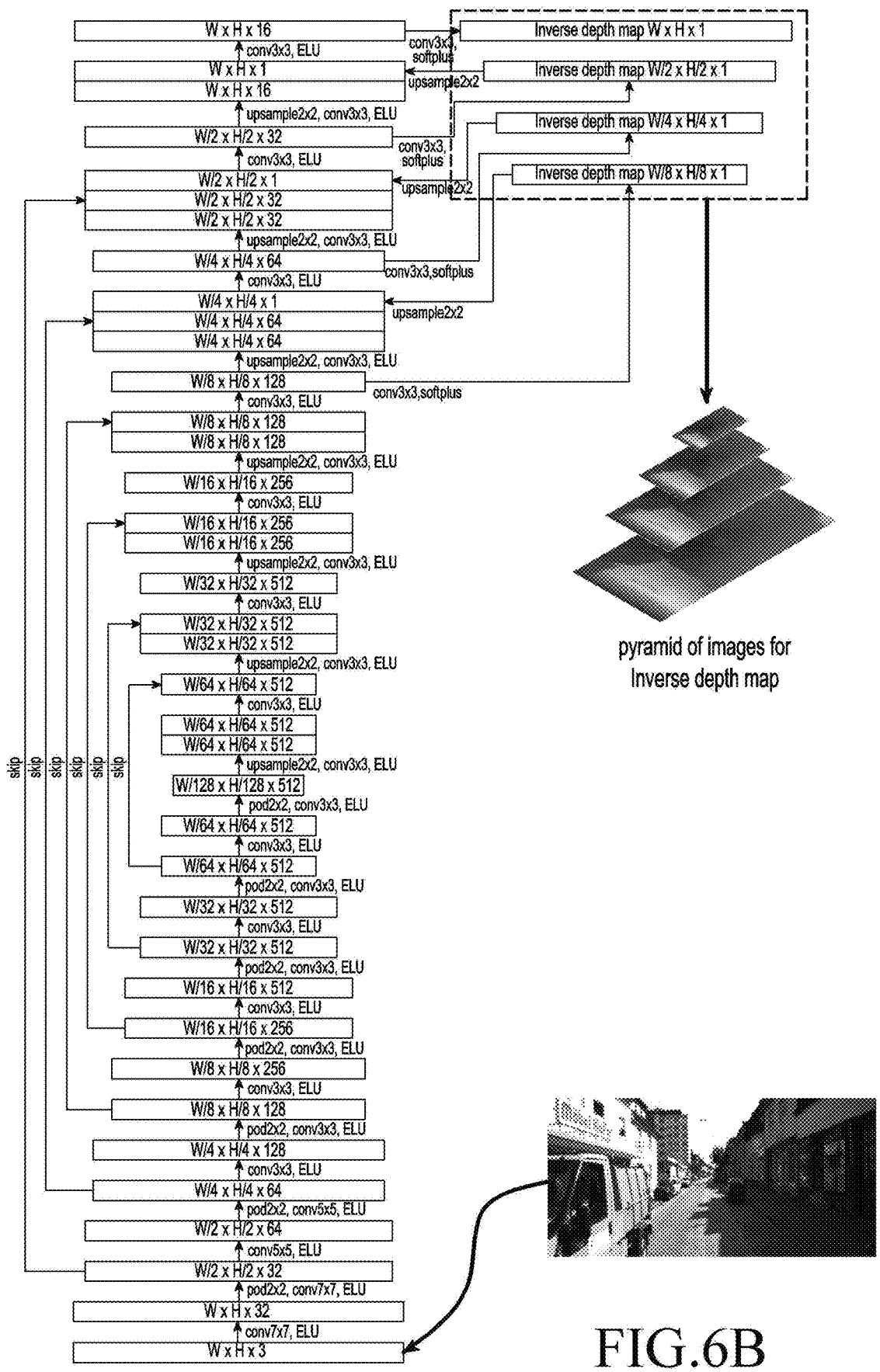
FIG. 6B is a processing diagram using a siamese convolutional neural subnetwork for depth map estimation, according to an embodiment.

FIG. 6B is a diagram of processing using a siamese convolutional neural subnetwork for depth map estimation, according to an embodiment.

As illustrated in FIG. 6B, when processing the subnetwork in part of compressing coding, the height and width of the image decrease (as a result, 128 times), and the number of feature maps increases up to 512 feature maps. Then in decoding part, the image size increases again. The subsample operation according to this embodiment is a decimation sample, according to which a value with a fixed position is selected from a square 2×2 (e.g., in the upper left corner of the square 2×2).

In addition, this network also differs from that previously described in that instead of a tanh activation function, a softplus activation function is used when producing inverse depth maps, which gives only positive values, which means that in order to calculate the depths from inverse depths, percentiles are not needed. The depth is simply calculated as the inverse of the inverse depth.

The loss function of the consistency of the left and right images is calculated as in Equation (9).

$$L_{con} = 4 \sum_{i=1}^{4} \frac{1}{N^{(i)}} \sum |d_L^{(i)} - d_L'^{(i)}| + |d_R^{(i)} - d_R'^{(i)}| \quad (9)$$

In the same manner as described above, a parameter equal to 4 is obtained empirically. $N^{(i)}$ is the number of points of disparity map or reconstructed disparity map for the left or right images at the i-th level of the image pyramid of disparity maps or reconstructed disparity maps for the left or right images. Similarly, at the same level of the image pyramid, the number of points of these images is the same, so it does not matter the number of points of which particular image is taken.

Thus, the described method adapts easily to different scenes due to the use of "unsupervised" training using self-training on stereo pair images. This allows any user to independently take a picture of any scene to get unallocated data for training, and provides the best precision of depth estimation, achieved by the above image correction. To estimate depth and image correction, the same convolutional neural subnetwork is used, which makes it possible to use more effectively the training signal of the loss function for reconstructed images to train more precise depth estimates. In addition, better precision of depth estimation is achieved by using a subnetwork for camera parameters estimating.

The described method provides more stable and less noisy depth assessment due to acquisition of auxiliary images. The generated disparity maps are used to reconstruct the "opposite" images and calculate the loss function for reconstructed auxiliary images, which additionally regularizes the process of training, resulting in an estimate that is less noisy and more robust to variations in the image acquisition process (matrix noise, features of light reflection from different surfaces and etc.).

The described method is robust to a variety of data samples for training, which is achieved through the use of a subnetwork for camera parameters estimation, which are further taken into account when converting inverse depth map to a disparity map.

FIG. 7 is a diagram of depth map estimation results, according to an embodiment, and in accordance with known solutions based on KITTI datasets, CityScapes and their combinations (KITTI+CityScapes or CityScapes->KITTI).

The KITTI+CityScapes designation means integration of the KITTI datasets and CityScapes into a single dataset, and the CityScapes->KITTI designation implies preliminary training on CityScapes dataset and subsequent development (training correction) on a KITTI dataset. Since in this field there is no single error metric for estimation of the number of incorrect depth estimation results, a comparison is made over many known error metrics, such as the absolute relative error value (ARD) metric, the relative quadratic error (SRD) metric, average quadratic error (RMSE) metric, logarithmic mean square error (RMSE (log)) metric, scale-invariant mean square error (RMSE (sc.inv.)) metric. Therefore, the smaller the error value calculated in these metrics, the more precise the depth estimate by the method.

In addition, the precision comparison table also lists the comparison results for the precision metric, according to which the percentage of depth map points is determined for which σ<1,25, where $$\sigma = \max\left(\frac{z_{true}}{z_{est}}, \frac{z_{est}}{z_{true}}\right),$$

where $z_{true}$ is the true image depth obtained using a laser scanner (LIDAR), and $z_{est}$ is the estimated depth calculated using this method, the accuracy of which is determined. Additionally, the precision comparison table also shows the comparison results for a quadratic precision metric, according to which the percentage of depth map points is determined for which σ<1,25², and the cubic precision metric, according to which the percentage of depth map points is determined for which σ<1,25³. Consequently, the greater the accuracy value calculated in these metrics, the more accurate the depth estimate by the method is.

The last column stands for the number of weight coefficients that are trained in the considered methods for depth estimation (i.e., reflects the computational complexity of the considered methods for depth estimation (the more weight coefficients, the higher the computational complexity)).

The precision comparison table lists the results for the following depth estimation methods: depth estimation using a method for training a convolutional neural network to reconstruct an image described with reference to FIG. 1, depth estimation using a method for training a convolutional neural network to reconstruct an image described with reference to FIG. 5, methods according to the previously known solutions.

As the table clearly shows, only the method according to the solution of H. Fu et al., 2017 has better precision than the described disclosure, however this method uses many times more weight coefficients (more than 7 times more) (i.e., it has much more computational complexity) and therefore takes more time to perform operations for depth estimation. The other methods are less precise than the described disclosure, while the described disclosure has one of the smallest computational complexity. Moreover, among the known solutions that use an unsupervised convolutional neural network model, the described disclosure has the best precision and the least (or comparable) computational complexity.

In addition, a comparison was made with a method for depth estimation, based on the search for correspondences between images (stereo mapping) with the method for depth estimation using cascade residual neural networks (CRL, 2017). This neural network was trained on the KITTI dataset, and the error according to the RMSE error metric (main metric) is equal to 3,358 meters, however, the number of weight coefficients that are trained in this known method is 78.7 M. Thus, the described disclosure is more efficient in computational complexity than this known solution, and in precision inferior to known solutions only with a fairly small margin.

Additionally, it was found that when teaching the described neural network using hybrid datasets, including stereo pairs taken by different stereo cameras, the precision of the described method only increases, while training the known methods using such hybrid datasets worsens the results of depth estimation using these methods, since the corresponding neural networks are "retrained".

Thus, despite the fact that when training according to this method, some set of unmarked stereo images is required, when processing by a trained network, it is sufficient to input a single image. This, among other things, significantly increases the speed of image processing, since there is no need to scan the entire scene or get a pair of stereo images, it is enough to get only one image using any standard monocular camera that most people currently have (e.g., in their personal mobile phones).

Figure 8:
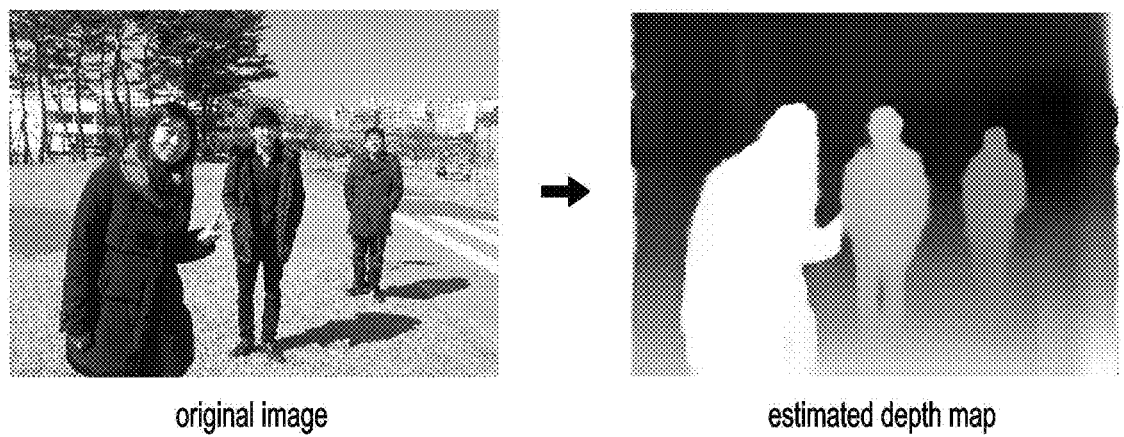
FIG. 8 is a diagram of an analyzed image and a generated depth map, according to an embodiment.

FIG. 8 is a diagram of an analyzed image and a generated depth map, according to an embodiment.

FIG. 8 shows an original input image taken on such a personal mobile phone (one example of a monocular camera) and processed by a convolutional neural network for image reconstruction, trained according to the described method for training a convolutional neural network to reconstruct an image, as well as a depth map resulting from using the aforementioned method, where the convolutional neural network was trained to reconstruct an image on the basis of data from arbitrary stereo films. In particular, a depth map is generated basing on the produced inverse depth maps. The figure depicts that the silhouette of a girl who stands closest to the camera is depicted as the lightest, the silhouette of a man who stands behind her is depicted gray, and the silhouette of a man who stands furthest away is depicted more darkly gray. The distant background (in particular, the sky, trees in the distance, etc.) are depicted in black.

The present disclosure can be applied in many industries, including, but not limited to: in unmanned vehicles to track the environment when traveling and parking; to navigate robots (currently using LIDAR: it is sensitive to shaking, expensive, not so fast, because scans the entire scene); for photo processing (applying effects to a photo, such as defocusing the entire photo except for an object closest to the camera, changing the color of the whole photo except for an object closest to the camera, color saturation of the object closest to the camera, etc.); to select and recognize objects in the scene by selecting objects according to their depth; to identify the user from a photograph, highlighting the user as the closest object, without installing additional hardware, such as a depth sensor; for segmentation of the image at merge of similar objects by dividing similar objects into separate objects taking into account their depth; for estimation of reciprocal speeds on the highway by estimating the range of other cars and changing this range in time; for realization of augmented reality by "entering" objects into the space of augmented reality while observing the appropriate scale and size of the objects; in medicine (e.g., for orienting the endoscope inside a patient basing on a depth map); and to convert two-dimensional films into three-dimensional films by predicting an image depth map and restoring the left or right image for it.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method for training a convolutional neural network to reconstruct an image, comprising:
    obtaining stereo pair images including left and right images ($I_L$, $I_R$) using a camera;
    inputting each of the left and right images ($I_L$, $I_R$) to a corresponding siamese convolutional neural network for depth map estimation;
    generating high-level feature maps and inverse depth maps for the inputted left and right images ($I_L$, $I_R$), respectively;
    processing the generated high-level feature maps based on the convolutional neural network to identify parameters of the camera;
    generating disparity maps ($d_L$, $d_R$) for the left and right images ($I_L$, $I_R$) by applying an affine transform to the inverse depth maps for the left and right images ($I_L$, $I_R$), respectively, based on the identified camera parameters;
    performing bilinear-interpolation sampling for the left and right images ($I_L$, $I_R$) based on the generated disparity maps ($d_L$, $d_R$) to obtain reconstructed left and right images ($I'_L$, $I'_R$), reconstructed disparity maps ($d'_L$, $d'_R$) and auxiliary images ($I''_L$, $I''_R$);
    forming a common loss function based on the left and right images ($I_L$, $I_R$), the reconstructed left and right images ($I'_L$, $I'_R$), the disparity maps ($d_L$, $d_R$), the reconstructed disparity maps ($d'_L$, $d'_R$) and the auxiliary images ($I''_L$, $I''_R$), and
    training the neural network based on the formed loss function.

2. The method of claim 1, wherein the performing the bilinear-interpolation sampling for the left and right images ($I_L$, $I_R$) comprises:
    performing the bilinear-interpolation sampling for the left image $I_L$ based on the disparity map $d_R$ for the right image $I_R$ to generate a reconstructed right image $I'_R$;
    performing the bilinear-interpolation sampling for the right image $I_R$ based on the disparity map $d_L$ for the left image $I_L$ to generate a reconstructed left image $I'_L$;
    performing the bilinear-interpolation sampling for the disparity map $d_L$ for the left image $I_L$ based on the disparity map $d_R$ for the right image $I_R$ to generate a reconstructed disparity map for the right image $I_R$;
    performing the bilinear-interpolation sampling for the disparity map $d_R$ for the right image $I_R$ based on the disparity map $d_L$ for the left image $I_L$ to generate a reconstructed disparity map for the left image $I_L$;
    performing the bilinear-interpolation sampling for the left image $I_L$ based on the reconstructed disparity map $d'_R$ for the right image $I_R$ to obtain an auxiliary right image $I''_R$; and
    performing the bilinear-interpolation sampling for the right image $I_R$ based on the reconstructed disparity map $d'_L$ for the left image $I_L$ to obtain an auxiliary left image $I''_L$.

3. The method of claim 1, wherein the common loss function includes a loss function for reconstructed images, which is calculated according to:

$$L_{rec}^{(L/R)} = \sum_{i=1}^{4} \frac{1}{N^{(i)}} \sum |I_{L/R}^{(i)} - I'^{(i)}_{L/R}| + w_{aux}|I'^{(i)}_{L/R} - I''^{(i)}_{L/R}|$$

$$L_{rec} = L_{rec}^{(L)} + L_{rec}^{(R)}$$

where $w_{aux}$ is an empirically selected positive parameter, and $N^{(i)}$ is a number of points of the left or right image or the reconstructed left or right image ($I'_L$, $I'_R$) at the i-th level of an image pyramid of the left or right images ($I_L$, $I_R$) or the reconstructed left or right images ($I'_L$, $I'_R$).

4. The method of claim 1, wherein the generating the high-level feature maps and the inverse depth maps includes processing the input left and right images ($I_L$, $I_R$) to generate a correction map for the left and right images ($I_L$, $I_R$), respectively.

5. The method of claim 4, further comprising calculating a loss function for correction according to:

$$L_{corr} = w_{corr} \sum_{i=1}^{2} \frac{1}{N^{(i)}} \sum |\Delta I_L^{(i)}| + |\Delta I_R^{(i)}|$$

where $w_{corr}$ is an empirically selected positive parameter, and $N^{(i)}$ is a number of points of the correction map for the left or right images ($I_L$, $I_R$) at the i-th level of the image pyramid of correction maps for the left or right images ($I_L$, $I_R$),
wherein the common loss function is equal to the sum of the loss function for the reconstructed images and the loss function for correction.

6. The method of claim 1, wherein the camera parameters include gain and bias.

7. The method of claim 1, wherein the generating the inverse depth maps for the left and right images ($I_L$, $I_R$) comprises generating depth maps for the left and right images ($I_L$, $I_R$) based on the generated inverse depth maps.

8. A method for training a convolutional neural network to reconstruct an image, comprising:
    obtaining stereo pair images including the left and right images ($I_L$, $I_R$) using a camera;
    inputting each of the left and right images ($I_L$, $I_R$) to a corresponding siamese convolutional neural network for depth map estimation;
    generating high-level feature maps, inverse depth maps and correction maps for the inputted left and right images ($I_L$, $I_R$), respectively;
    processing the generated high-level feature maps based on the convolutional neural network to identify parameters of the camera;
    generating disparity maps ($d_L$, $d_R$) for the left and right images ($I_L$, $I_R$) by applying an affine transform to inverse depth maps for the left and right images ($I_L$, $I_R$), respectively, based on the identified camera parameters;

generating corrected left and right images using the correction maps;

performing bilinear-interpolation sampling for the corrected left and right images based on the generated disparity maps ($d_L$, $d_R$) to obtain reconstructed left and right images ($I'_L$, $I'_R$), reconstructed disparity maps ($d'_L$, $d'_R$) and auxiliary images ($I''_L$, $I''_R$);

forming a common loss function based on the corrected left and right images, reconstructed left and right images ($I'_L$, $I'_R$), correction maps, disparity maps ($d_L$, $d_R$), reconstructed disparity maps ($d'_L$, $d'_R$) for the left and right images ($I_L$, $I_R$) and the auxiliary images ($I''_L$, $I''_R$), and training the convolutional neural network based on the formed loss function.

9. The method of claim 8, wherein the performing the bilinear-interpolation sampling for the corrected left and right images comprises:

performing the bilinear-interpolation sampling for the corrected left image based on the disparity map $d_R$ for the right image $I_R$ to generate a reconstructed right image $I'_R$;

performing the bilinear-interpolation sampling for the corrected right image based on the disparity map $d_L$ for the right image $I_R$ to generate a reconstructed right image $I'_L$;

performing the bilinear-interpolation sampling for the disparity map $d_L$ for the left image $I_L$ based on the disparity map $d_R$ for the right image $I_R$ to generate a reconstructed disparity map for the right image $I_R$;

performing the bilinear-interpolation sampling for the disparity map $d_R$ for the right image $I_R$ based on the disparity map $d_L$ for the left image $I_L$ to generate a reconstructed disparity map for the left image $I_L$;

performing the bilinear-interpolation sampling for the corrected left image based on the reconstructed disparity map $d'_R$ for the right image $I_R$ to obtain an auxiliary right image $I''_R$, and performing the bilinear-interpolation sampling for the corrected right image based on the reconstructed disparity map $d'_L$ for the left image $I_L$ to obtain an auxiliary right image $I''_L$.

10. The method of claim 8, wherein the common loss function includes a loss function for reconstructed images, which is calculated according to:

$$L_{rec}^{(L/R)} = \sum_{i=1}^{4} \frac{1}{N^{(i)}} \sum |I_{L/R}^{(i)} - I'^{(i)}_{L/R}| + w_{aux}|I_{L/R}^{(i)} - I''^{(i)}_{L/R}|$$

$$L_{rec} = L_{rec}^{(L)} + L_{rec}^{(R)}$$

where $w_{aux}$ is an empirically selected positive parameter, and $N^{(i)}$ is a number of points of the left or right image ($I_L$, $I_R$) or the reconstructed left or right image ($I'_L$, $I'_R$) at the i-th level of the image pyramid of the images ($I_L$, $I_R$) or the reconstructed images ($I'_L$, $I'_R$).

11. The method of claim 8, wherein the common loss function includes a loss function for correction, which is calculated according to:

$$L_{corr} = w_{corr} \sum_{i=1}^{2} \frac{1}{N^{(i)}} \sum |\Delta I_L^{(i)}| + |\Delta I_R^{(i)}|$$

where $w_{aux}$ is an empirically selected positive parameter, and $N^{(i)}$ is a number of points of the correction map for left or right images at the i-th level of the image pyramid of correction maps for left or right images ($I_L$, $I_R$).

12. The method of claim 8, wherein camera parameters include gain and bias.

13. The method of claim 8, wherein the generating the inverse depth maps for the left and right images ($I_L$, $I_R$) comprises generating depth maps for the left and right images ($I_L$, $I_R$) based on the generated inverse depth maps.

14. A system for depth map generation from an image, comprising:

a monocular camera capable of obtaining an image;

a processing device configured to process the obtained image using a convolutional neural network for image reconstruction, the convolutional neural network trained according to a method for training a convolutional neural network to reconstruct an image according to claim 1, and a memory configured to store generated images and data obtained as a result of image processing using the convolutional neural network, wherein the processing of the taken image includes depth map generation for the taken image based on generated inverse depth maps.

15. A system for depth map generation from an image, comprising:

a monocular camera capable of obtaining an image;

a processing device configured to process the obtained image using a convolutional neural network for image reconstruction, the convolutional neural network trained according to a method for training a convolutional neural network to reconstruct an image according to claim 8, and a memory configured to store generated images and data obtained as a result of image processing using the convolutional neural network, wherein the processing of the taken image includes depth map generation for the taken image based on generated inverse depth maps.

* * * * *